(No Model.) 2 Sheets—Sheet 1.
J. S. ADAMS.
COMBINED FRICTION AND POSITIVE CLUTCH.
No. 460,625. Patented Oct. 6, 1891.
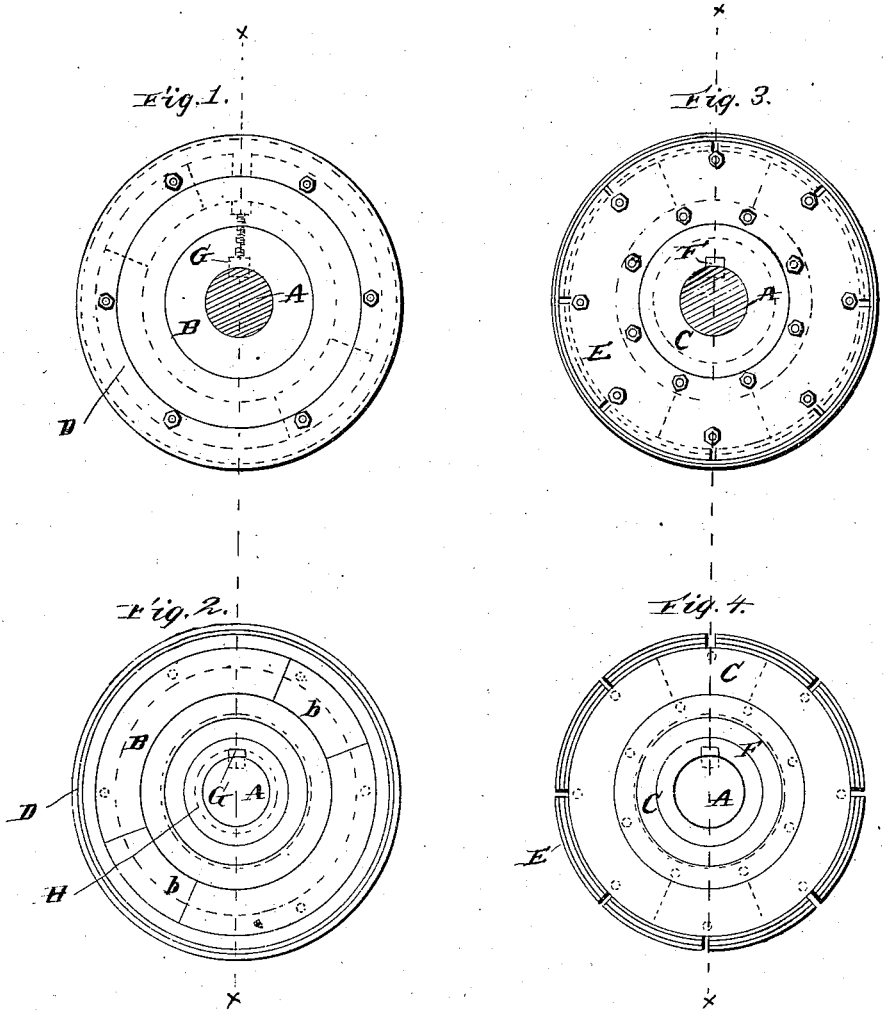

(No Model.) 2 Sheets—Sheet 2.
J. S. ADAMS.
COMBINED FRICTION AND POSITIVE CLUTCH.
No. 460,625. Patented Oct. 6, 1891.
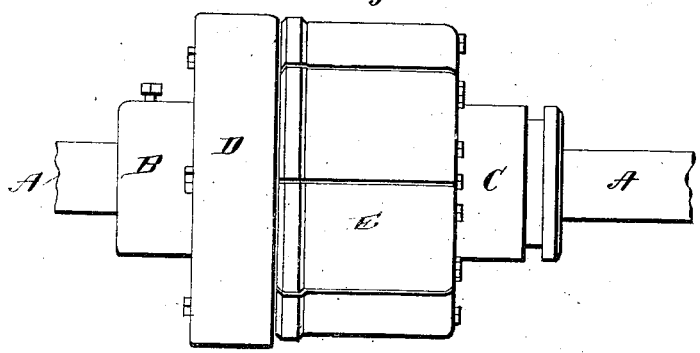
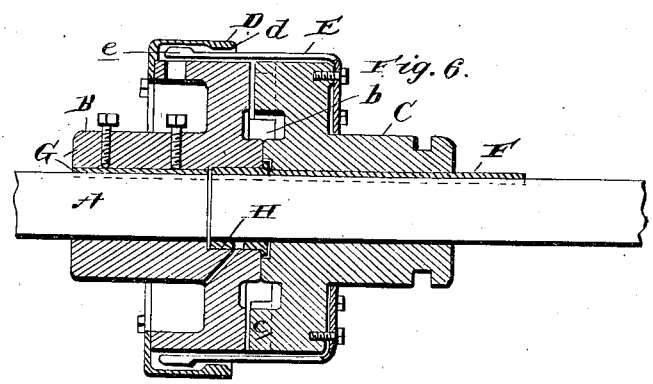
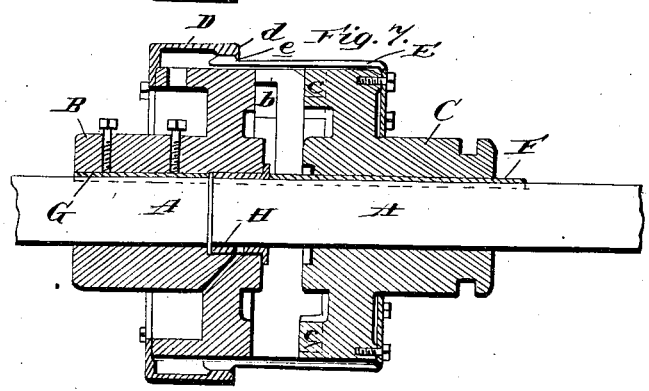
Witnesses:
C. H. Rueder
James J. Sheehy
Inventor:
John S. Adams
W. R. Stringfellow
Attorney

UNITED STATES PATENT OFFICE.

JOHN S. ADAMS, OF ELGIN, ILLINOIS.

COMBINED FRICTION AND POSITIVE CLUTCH.

SPECIFICATION forming part of Letters Patent No. 460,625, dated October 6, 1891.

Application filed April 7, 1891. Serial No. 388,055. (No model.)

*To all whom it may concern:*

Be it known that I, JOHN SPENCER ADAMS, a citizen of the United States, residing at Elgin, in the county of Kane and State of Illinois, have invented certain new and useful Improvements in a Combined Friction and Positive Clutch; and I do declare the following to be a full, clear, and exact description of the invention, such as will enable others skilled in the art to which it appertains to make and use the same.

My invention relates to a combined friction and positive clutch, and its novelty will be fully understood from the following description and claims, taken in connection with the accompanying drawings; and the objects of my invention are to form a clutch by which the machinery connected therewith may be started and brought up to speed by contact of the frictional mechanism, after which the positive clutching device may be thrown into action. I attain these objects by the mechanism illustrated in the accompanying drawings of a clutch-coupling, in which—

Figure 1 shows outer face of fixed head. Fig. 2 shows inner face of fixed head. Fig. 3 shows outer face of sliding head. Fig. 4 shows inner face of sliding head. Fig. 5 is a side view showing clutch mechanism disconnected. Fig. 6 is a vertical section showing positive clutch connected. Fig. 7 is a vertical section showing frictional connection.

Similar letters refer to similar parts throughout the several views in the drawings.

A refers to the central shaft, in two sections, to be coupled by the clutch-coupling.

B is the fixed head firmly secured to the shaft by the key G and the set-screws shown.

C is the sliding head, which may be moved longitudinally upon the shaft, but is prevented from revolving loosely thereupon by means of the feather F, secured in the shaft.

D is a friction-ring securely attached to head B by screws or other suitable means. The outer face or periphery of this ring D is cylindrical and smooth; but its inner surface or bore has a marginal contraction or internal annular flange with beveled edges, as shown by $d$ in the sectional views.

E is a spring friction-ring, which is secured by screws to sliding head C. The cylindrical portion of this ring is sawed into segments, which imparts to these segments a spring action, which permits their ends to be compressed when forced inside of the marginal contraction $d$ of the friction-ring D. Upon the ends of the segments of ring E are formed external enlargements with beveled edges, as shown at $e$ in the several views. The inner circle of screws connecting ring E with head C are intended to be used to adjust the friction of the parts $e$ and $d$, the friction being increased by dishing the center of the flat portion of the ring, and thus expanding the friction ends of the segments.

H is a bushing or bearing for the shaft. $b$ $b$ are the positive clutch-jaws of the fixed head. $c$ $c$ are the positive clutch-jaws of the sliding head.

The operation of this clutch may be readily understood by referring to Figs. 5, 6, and 7. In Fig. 5 the clutch mechanism is disconnected. When it is desired to couple the two sections of the shaft, (one section being in motion,) the sliding head is advanced so as to bring the frictional parts $d$ and $e$ into contact, as shown in Fig. 7. The clutch is held at this point until both sections of shaft are revolving at substantially the same speed, and then the sliding head is quickly thrown forward, thus locking the two heads together, as shown in Fig. 6, and forming a positive clutch.

Having described my invention, what I claim, and desire to secure by Letters Patent, is—

1. In a clutch, substantially as described, the combination, with the head fixedly mounted upon its shaft and the friction-ring connected to said head and provided on its inner surface or bore with a marginal flange having beveled edges, of the sliding head keyed or feathered upon its shaft, and the friction-ring connected to said head and having its cylindrical portion formed by segments provided with external enlargements at their ends, the said enlargements of the segments having beveled edges and adapted to operate in conjunction with the beveled flange of the friction-ring upon the fixed head, substantially as specified.

2. In a clutch, the combination, with the head fixedly mounted upon its shaft, the friction-ring connected to said head and provided on its inner surface or bore with a marginal flange having beveled edges, and the clutch-jaws upon the inner face of said head, of the sliding head keyed or feathered upon its shaft, the friction-ring connected to said head and having its cylindrical portion formed by segments provided with external enlargements at their ends having beveled edges, and the clutch-jaws on the inner face of said head adapted to engage those of the fixed head, substantially as and for the purpose specified.

In testimony whereof I affix my signature in presence of two witnesses.

JOHN S. ADAMS.

Witnesses:
   WILLIAM WILSON,
   PERCY D. PARKS.